Dec. 22, 1970   A. H. SILVER ET AL   3,549,991
SUPERCONDUCTING FLUX SENSITIVE DEVICE WITH SMALL AREA CONTACTS
Filed Feb. 24, 1969   2 Sheets-Sheet 1
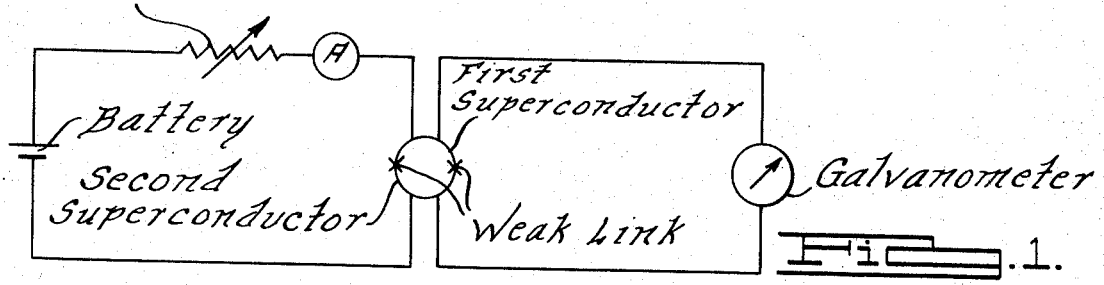
Fig. 1.
Fig. 2.
Fig. 3.
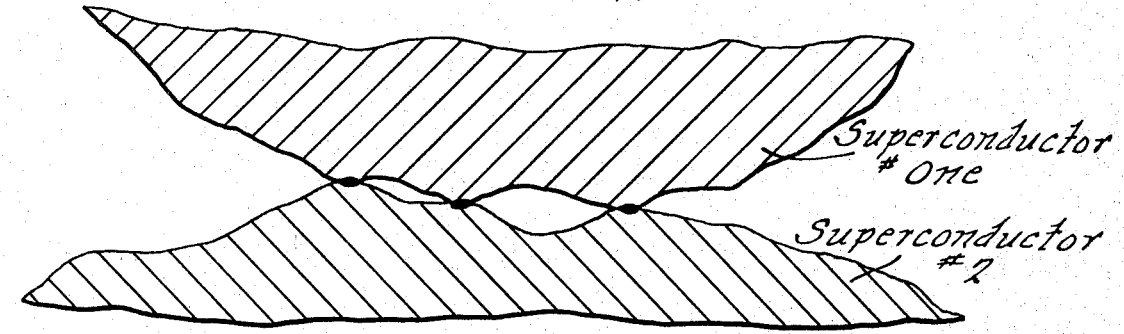
Fig. 4.
INVENTORS
Arnold H. Silver
James E. Zimmerman
BY John R. Faulkner
Keith L. Zerschling
ATTORNEYS

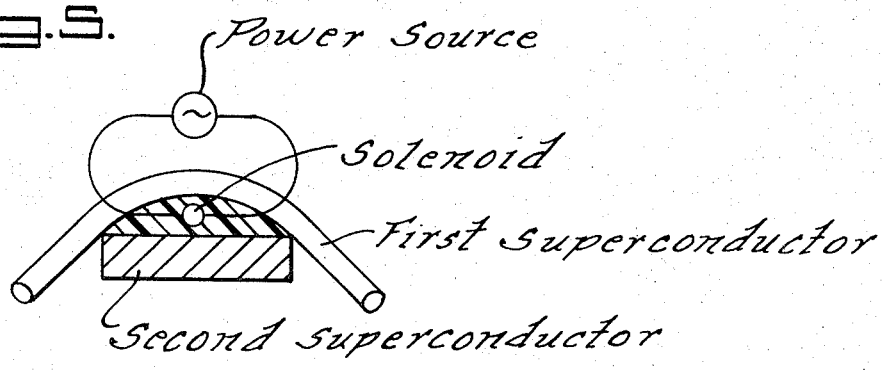
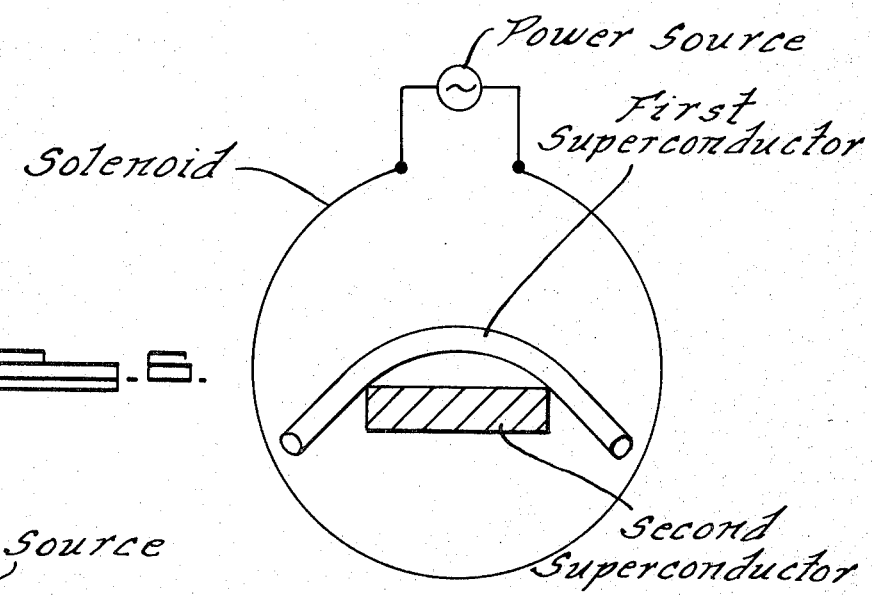
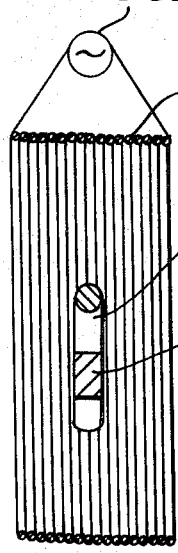

United States Patent Office 3,549,991
Patented Dec. 22, 1970

3,549,991
SUPERCONDUCTING FLUX SENSITIVE DEVICE
WITH SMALL AREA CONTACTS
Arnold H. Silver, Farmington, Mich., and James E.
Zimmerman, Santa Ana, Calif., assignors to Ford
Motor Company, Dearborn, Mich., a corporation of
Delaware
Continuation-in-part of application Ser. No. 449,986,
Apr. 22, 1965. This application Feb. 24, 1969, Ser.
No. 801,728
Int. Cl. G01r 33/02
U.S. Cl. 324—43
12 Claims

ABSTRACT OF THE DISCLOSURE

A magnetic flux sensitive device including a first and second superconductor joined to provide a plurality of superconducting paths between the first and second superconductors. Small area contacts are provided between the first and second superconductors in each superconducting path, with the superconducting paths and the superconductors together with the small area contacts forming a loop enclosing a finite area or finite areas for the reception of magnetic flux. This device may be used for measuring changes in magnetic flux by providing a means for measuring the maximum supercurrent through the two superconductors.

This invention relates to a device dependent upon the interaction between superconductors and a magnetic flux passing through an area enclosed by the superconductors. Small area contacts or weak links, each of which comprise a plurality of contacts between the superconductors and enclose one or more finite areas, provide a periodic sensitivity to changes in magnetic flux through the areas enclosed by the superconductors and through the areas enclosed by the small area contacts or weak links.

This application is a continuation-in-part of our copending application S.N. 449,986 filed Apr. 22, 1965, now abandoned.

BRIEF DESCRIPTION OF THE DRAWINGS

FIG. 1 is a circuit diagram of a device in which changes occur in the maximum supercurrent flowing through a pair of superconductors under the influence of a varying magnetic flux.

FIG. 2 is a graph of the maximum supercurrent through the device shown in FIG. 1 plotted against an applied magnetic field. This graph represents the results obtained when the flux flows only through the area enclosed by the superconductors and not through the small area contacts.

FIG. 3 is a graph similar to FIG. 2, but showing the maximum supercurrent through the device shown in FIG. 1 where the small area contacts are exposed to the magnetic flux as well as the area enclosed by the superconductors.

FIG. 4 is a schematic representation of a typical small area contact which is obtained by crossing two superconducting wires under light pressure.

FIG. 5 discloses a superconducting structure that may be employed in the circuit of FIG. 1 with means for producing a varying flux only in the area enclosed by the superconductors.

FIG. 6 is a view of the superconducting structure shown in FIG. 5 with means for producing a varying flux in the area enclosed by the superconductors and through the areas formed by the small area contacts.

FIG. 7 is a sectional view partially in elevation of the structure shown in FIG. 6.

DESCRIPTION OF THE PREFERRED EMBODIMENT

Referring now to the drawings, there is shown in FIG. 1 a battery or other source of potential that causes a current controlled by the variable resistance to flow through a first superconductor and a second superconductor which are bifurcated to enclose a definite finite area. Each of the branches of this bifurcation is provided with a weak link in the form of small area contacts positioned between the superconductors. These weak links or small area contacts operate in an intermediate or flux flow state and are responsible for the peculiar or unique response of this device to a varying magnetic field or flux. The intermediate or flux flow state referred to above is a state intermediate a superconducting and a non superconducting or normal state. As will be explained subsequently, the flux or magnetic field may be passed through the area enclosed by the bifurcation only or may pass through this area as well as through areas enclosed by the weak links or small area contacts. The galvanometer is provided for mesuring the appearance of potential across the superconducting system particularly the weak links or small area contacts, and the ammeter is provided for measuring the supercurrent through the device.

FIG. 4 shows the weak link or small area contacts of the present invention formed by two superconductors lightly pressed together. The surface roughness of the two superconductors is sufficient to afford discrete multiple connections between them to form three parallel superconducting paths of very small dimension enclosing two finite areas that are capable of receiving magnetic flux. Such a structure is typically obtained by crossing two #36 niobium wires and applying pressure of five grams to the joint. The ohmic resistance of this joint is about 1 ohm. The wires may be secured in this position by the application of any nonconducting adhesive. The structure shown in FIG. 4 may form one of the weak links shown in FIG. 1. The two niobium wires may be arranged to form the loop and the two weak links shown in FIG. 1 by forming each wire in a substantially U-shaped configuration and pressing them together at two spaced points to form the loop, with the two weak links interconnecting the two wires.

FIG. 5 shows a typical embodiment of a superconducting device shown in FIG. 1 which has a pair of small area contacts as described in relationship to FIG. 4. This device comprises niobium ribbon which forms the second superconductor shown in FIG. 1 crossed by a bent niobium wire which forms the first superconductor shown in FIG. 1. The bent niobium wire contacts the ribbon only near the two edges thus enclosing a lens shaped area whose width depends upon the curvature of the wire.

A magnetic flux or field is caused to pass through the small area enclosed by the superconductors with such precision as not to contact the small area contacts. This can be accomplished by inserting a solenoid in the area enclosed between the two joined superconductors. This solenoid may be constructed of a closely wound $10^{-3}$ inch copper wire with an outside diameter of $6 \times 10^{-3}$ inches and 0.4 inch long. This solenoid can provide a field within itself while maintaining the field external to it at the superconductors vanishingly small. Such a structure is disclosed in Physical Review Letters, vol. 12, No. 11, dated Mar. 16, 1964. The solenoid may be held in place by embedding it in a plastic or insulating material positioned in the area enclosed between the two superconductors. A power source is connected to the solenoid which will provide a varying current to the solenoid thereby providing the varying magnetic field. The area enclosed by the superconductor must, of course, be large enough to accommodate the solenoid described above.

The response of such a device is shown in FIG. 2. In FIG. 2 the quantity $I_m$ may be measured by the ammeter connected in series with the battery, variable resistor, first superconductor and second superconductor shown in FIG. 1. The galvanometer on the right hand side of FIG. 1 measures the voltage appearing across the superconducting small area contacts that are in their intermediate or flux flow state, and from the positioning of this galvanometer, it can readily be seen that placing the ammeter in the other circuit would measure the current $I_m$. The abcissa in FIG. 2 is the magnetic flux through the hole when the flux flows only through the area enclosed and not through the small area contacts. Additionally, the curve in FIG. 2 is a plot of the maximum current that can flow through the two superconductors joined with the small area contacts as a function of increasing magnetic fields. Taking any position on the abcissa this is the maximum current that can be forced through the device at any given magnetic field. It can be readily appreciated that these maximum currents vary as the magnitude of the magnetic flux through the hole is increased and that this maximum current is periodic with respect to the applied magnetic field.

FIGS. 6 and 7 disclose a superconductive device similar to that shown in FIG. 5 and suitable for use in the circuit shown in FIG. 1. In this case a solenoid surrounds the device comprised of the two superconductors. The solenoid is connected to a variable power source which is capable of applying a varying current to the solenoid thereby varying the magnetic flux or field set up by the solenoid. The magnetic field or flux set up by the solenoid shown in FIGS. 6 and 7 passes through the area enclosed by the two superconductors and also passes through the areas enclosed by the small area contacts. These areas are shown in FIG. 4 and have been discussed previously. The device shown in FIGS. 6 and 7 may comprise a ribbon 0.008 inch wide and a wire 0.002 inch in diameter. This structure would enclose an area 0.008 inch long and having a typical width of 0.0025 inch.

Referring now to FIG. 3 there is shown a graph of the maximum supercurrent that can flow through the two superconductors joined with the small area contacts in the system shown in FIGS. 6 and 7 as a function of increasing the magnetic field. It can be seen that there is a fundamental periodicity having imposed thereon another periodicity. The fundamental periodicity results from magnetic flux passing through the area enclosed by the two superconductors and it would be equal to the periodicity shown in FIG. 2 provided that areas enclosed by the two superconductors are the same in the device shown in FIG. 5 and the device shown in FIGS. 6 and 7. The periodicity imposed upon this fundamental is caused by the flux or field passing through the smaller areas enclosed by the small area contacts shown in FIG. 4.

The periodicity shown in FIG. 2 and both periodicities shown in FIG. 3 correspond to a flux change of $2.07 \times 10^{-7}$ gauss/cm.$^3$. This means that if the area enclosed by the two superconductors of the device shown in FIG. 5 and the device shown in FIGS. 6 and 7 enclose an area of one square centimeter, the period or peak spacing would be $2.07 \times 10^{-7}$ gauss.

Thus, the peak spacing of the curves shown in FIGS. 2 and 3 depends on the actual area of the loop enclosed by the first and second superconductors while the periodicity imposed on the fundamental periodicity shown in FIG. 3 has a much smaller period or spacing which is brought about by the actual area enclosed by the small area contacts shown in FIG. 4 that have a magnetic flux enclosed therein. The phenomenon of the period shown in FIG. 2 and the fundamental period shown in FIG. 3 is known in the prior art and is more fully explained in Physical Review Letters, vol. 12, No. 7, dated Feb. 17, 1964.

Attention is invited to an article by applicants published May 15, 1964 in Physical Review Letters, vol. 10, No. 1, pp. 47 and 48, entitled "Quantum Effects in Type II Superconductors."

What is claimed is:

1. A magnetic flux sensitive device comprising a first superconductor and a second superconductor, a pair of spaced small area contacts formed by contacting said first superconductor and second superconductor so as to provide at least a pair of superconducting paths between the first and second superconductors, each of said small area contacts comprising discrete multiple connections between said first and said second superconductors caused by the surface roughness of said superconductors, said superconductors joined by contacting said superconductors under light pressure, said first and second superconductors together with said spaced small area contacts being connected to form a loop with said pair of small area contacts being positioned at spaced positions in said loop, one of said small area contacts being positioned in each of said superconducting paths, said loop enclosing a finite area for the reception of magnetic flux, means coupled to said superconductors for producing current in said superconducting paths, means positioned adjacent said loop for producing a varying magnetic field within said finite area, and means coupled to said superconductors for sensing the current in said superconductors.

2. The combination of claim 1 in which the discrete multiple connections between first and second superconductors enclose multiple finite areas and in which the means positioned adjacent the loop for producing a magnetic field within said finite area also produces a magnetic field within the multiple finite area enclosed by said discrete multiple connections.

3. The combination of claim 1 in which said first and second superconductors are formed of superconducting wire.

4. A magnetic flux sensitive device comprising a first superconductor and a second superconductor, said first superconductor and said second superconductor being joined so as to provide a plurality of superconducting paths between the first and second superconductors with a small area contact directly connecting said first and said second superconductors in each of said superconducting paths, each of said small area contacts comprising discrete multiple connections between said first and second superconductors caused by the surface roughness of said superconductors, said superconductors joined by contacting said superconductors under light pressure, said superconducting paths and said superconductors together with small area contacts forming a loop enclosing finite areas for the reception of magnetic flux, means coupled to said superconductors for producing current in said superconducting paths, means positioned adjacent said loop for producing a varying magnetic field within said finite area, and means coupled to said superconductors for sensing the current in said superconductors.

5. The combination of claim 4 in which the discrete multiple connections between the first and second superconductors enclose multiple finite areas and in which the means positioned adjacent the loop for producing a magnetic field within said finite area also produces a magnetic field within the multiple finite areas enclosed by said discrete multiple connections.

6. The combination of claim 4 in which said first and second superconductors are formed of superconducting wire.

7. A device for measuring changes in a magnetic flux comprising a first superconductor and a second superconductor and means for measuring the maximum supercurrent through said first and second superconductors, said first superconductor and said second superconductor being joined so as to provide at least a pair of superconducting paths between the first and second superconductors with a small area contact directly connecting said first and said second superconductors in each of said superconducting paths, each of said small area contacts comprising discrete multiple connections between said first and second superconductors caused by the surface roughness of said superconductors, said superconductors joined by contacting said superconductors under light pressure, said superconducting paths and said superconductors together with said small area contacts forming a loop enclosing a finite area for the reception of magnetic flux, means coupled to said superconductors for producing current in said superconducting paths, means positioned adjacent said loop for producing a varying magnetic field within said area, and means coupled to said loop for sensing the supercurrent in said superconductors.

8. The combination of claim 7 in which the discrete multiple connections between the first and second superconductors enclose multiple finite areas and in which the means positioned adjacent the loop for producing a magnetic field within said finite area also produces a magnetic field within the multiple finite areas enclosed by said discrete multiple connections.

9. The combination of claim 7 in which said first and second superconductors are formed of superconducting wire.

10. A device for measuring changes in a magnetic flux comprising a first superconductor and a second superconductor and means for measuring the maximum supercurrent through said first and second superconductors, said first superconductor and said second superconductor being joined so as to provide a plurality of superconducting paths between the first and second superconductors with a small area contact directly connecting said first and said second superconductors in each of said superconducting paths, each of said small area contacts comprising discrete multiple connections between said first and second superconductors caused by the surface roughness of said superconductors, said superconductors joined by contacting said superconductors under light pressure, said superconducting paths and said superconductors together with said small area contacts forming a loop enclosing finite areas for the reception of magnetic flux, means coupled to said superconductors for producing current in said superconducting paths, means positioned adjacent said loop for producing a varying magnetic field within said finite area, and means coupled to said superconductors for sensing the current in said superconductors.

11. The combination of claim 10 in which the discrete multiple connections between the first and second superconductors enclose multiple finite areas and in which the means positioned adjacent the loop for producing a magnetic field within said finite area also produces a magnetic field within the multiple finite areas enclosed by said discrete multiple connections.

12. The combination of claim 10 in which said first and second superconductors are formed of superconducting wire.

References Cited

UNITED STATES PATENTS

| | | | |
|---|---|---|---|
| 3,239,375 | 3/1966 | Ames | 338—32 |
| 3,363,200 | 1/1968 | Jaklevic et al. | 332—51 |
| 3,363,211 | 1/1968 | Lambe et al. | 307—306 |

OTHER REFERENCES

Jaklevic et al., Quantum Interference Effects in Josephson Tunneling, Physical Review Letters, vol. 12, No. 7, February 1964, pp. 159–160.

Jaklevic et al., Quantum Interference From a Static Vestor Potential in a Field-Free Region; Physical Review Letters, vol. 12, No. 11, March 1964, pp. 274–275.

GERALD R. STRECKER, Primary Examiner

R. J. CORCORAN, Assistant Examiner

U.S. Cl. X.R.

332—51; 307—245, 306, 212